US009384589B2

(12) United States Patent
Andrews et al.

(10) Patent No.: US 9,384,589 B2
(45) Date of Patent: Jul. 5, 2016

(54) ANTI-ALIASING FOR GEOMETRIES

(71) Applicant: Microsoft Technology Licensing, LLC, Redmond, WA (US)

(72) Inventors: Claire Marie Louise Andrews, Kirkland, WA (US); Blake D. Pelton, Redmond, WA (US); Anthony John Rolls Hodsdon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 450 days.

(21) Appl. No.: 13/873,093

(22) Filed: Apr. 29, 2013

(65) Prior Publication Data
US 2014/0320493 A1    Oct. 30, 2014

(51) Int. Cl.
*G06T 15/40*    (2011.01)
*G06T 17/20*    (2006.01)

(52) U.S. Cl.
CPC ............ *G06T 17/20* (2013.01); *G06T 2210/62* (2013.01)

(58) Field of Classification Search
None
See application file for complete search history.

(56) References Cited

U.S. PATENT DOCUMENTS

| | | | |
|---|---|---|---|
| 6,542,151 B1* | 4/2003 | Minami et al. | 345/419 |
| 7,605,825 B1 | 10/2009 | Lau et al. | |
| 7,952,580 B1* | 5/2011 | Yhann et al. | 345/423 |
| 8,203,564 B2 | 6/2012 | Jiao et al. | |
| 8,243,070 B1 | 8/2012 | Brown | |
| 8,300,052 B1* | 10/2012 | Hetu | 345/442 |
| 8,325,177 B2 | 12/2012 | Lawrence et al. | |
| 2001/0033281 A1* | 10/2001 | Yoshida et al. | 345/420 |
| 2004/0075655 A1* | 4/2004 | Dunnett | 345/418 |
| 2004/0135795 A1* | 7/2004 | Raubacher et al. | 345/611 |
| 2006/0082593 A1* | 4/2006 | Stevenson et al. | 345/611 |
| 2006/0139348 A1* | 6/2006 | Harada et al. | 345/420 |
| 2007/0139440 A1* | 6/2007 | Crow et al. | 345/614 |
| 2008/0106547 A1* | 5/2008 | Kataoka | G06T 17/20 345/420 |
| 2010/0020080 A1* | 1/2010 | Iwanaga | 345/426 |
| 2010/0086208 A1* | 4/2010 | Beckman | G06T 17/20 382/173 |
| 2010/0214294 A1 | 8/2010 | Li et al. | |
| 2011/0316871 A1 | 12/2011 | Srinivasan et al. | |
| 2012/0206468 A1* | 8/2012 | Bratt et al. | 345/547 |
| 2013/0271463 A1* | 10/2013 | Curington et al. | 345/420 |

OTHER PUBLICATIONS

"Geometry Realization Sample", Retrieved from <http://msdn.microsoft.com/en-us/library/dd756659(v=vs.85).aspx> on Apr. 10, 2013, (Sep. 6, 2011), 7 pages.

(Continued)

*Primary Examiner* — Anh-Tuan V Nguyen
(74) *Attorney, Agent, or Firm* — Sunah Lee; Judy Yee; Micky Minhas

(57) ABSTRACT

Techniques for anti-aliasing for geometries are described. In at least some embodiments, a graphical image is reduced to a collection of polygonal geometric primitives ("geometries"). The individual geometries are processed according to techniques discussed herein such that anti-aliasing is applied to the geometries when the geometries are displayed as part of the graphical image. For example, anti-aliasing of a general-purpose geometry is achieved via an associated collection of quadrilaterals and bevels that can be dynamically transformed when the geometry is rendered for display. In at least some embodiments, quadrilaterals and bevels generated for a geometry enable the geometry to be dynamically transformed and re-rendered multiple times to achieve a variety of visuals.

20 Claims, 12 Drawing Sheets

(56) References Cited

OTHER PUBLICATIONS

"ID2D1 Device Context: Draw Bitmap Method" Retrieved from <http://msdn.microsoft.com/en-us/library/hh847972(v=vs.85).aspx> on Apr. 17, 2013, (Nov. 29, 2012), 3 pages.

Bunnell, Michael "Adaptive Tessellation of Subdivision Surfaces with Displacement Mapping", Retrieved from <http://http.developer.nvidia.com/GPUGems2/gpugems2_chapter07.html> on Apr. 8, 2013, (Mar. 13, 2005), 4 Pages.

Fatahalian, et al., "Reducing Shading on GPUs using Quad-Fragment Merging", *In Journal of ACM Transactions on Graphics*, vol. 29, Issue 4, (Jul. 2010), 8 pages.

Loop, Charles et al., "Resolution Independent Curve Rendering Using Programmable Graphics Hardware", *In Journal of ACM Transactions on Graphics*, vol. 24, Issue 3, (Jul. 2005), 10 pages.

"International Search Report & Written Opinion for PCT Patent Application No. PCT/US2013/060773", Mailed Date: Dec. 6, 2013, Filed Date: Sep. 20, 2013, 13 Pages.

Crisu, et al.,"Efficient Hardware for Antialiasing Coverage Mask Generation", In Proceedings of Computer Graphics International, Jun. 19, 2004, 16 Pages.

Akeley, Kurt, "Reality Engine Graphics", In Proceedings of the 20th Annual Conference on Computer Graphics and Interactive Techniques, Aug. 2, 1993, 8 Pages.

Pai, et al., "New Method for Analytic Antialiasing of a Polygon on Low end GPUs", In Ip.com, Prior Art Database, Technical Disclosure, Jul. 19, 2012, 5 Pages.

\* cited by examiner

ANTI-ALIASING FOR GEOMETRIES

BACKGROUND

Today's computing devices have access to a variety of visual content. To enable visual content to be displayed, visual content is typically processed in various ways prior to being displayed. For example, graphics data is typically converted from complex geometries into simpler geometric primitives that can be processed and displayed as part of more complex images.

One such technique for converting geometries into simpler primitives is known as tessellation. Generally, tessellation involves converting a complex shape into a group of simple polygons (e.g., triangles) that can be processed and displayed. While tessellation is useful for rendering high-quality graphics, it is also associated with significant computing resource costs.

A common approach to mitigate the resource cost of tessellation is to separate graphics rendering out into two passes. A first pass is known as a "realization" pass that converts a geometry into an intermediate form (called a "realization") that is cached, such as on a central processing unit ("CPU") and/or on a graphics processing unit ("GPU"). A second pass is known as a "draw" pass that takes the cached realization along with a transform and a "brush" (e.g., a mapping from pixel positions to color values) and renders a primitive. Thus, the expensive CPU cost of tessellation can be incurred once, while the primitive itself can be rendered multiple times with varying transforms and brushes to reduce CPU overhead.

While current techniques may utilize this two-pass approach to rendering primitives, such techniques suffer from a number of drawbacks. For example, some techniques employ multi-sample-based anti-aliasing that can significantly increase GPU costs and thus affect overall rendering performance. Moreover, such techniques are not typically supported on many current GPUs. Other techniques may rasterize a geometry to generate a coverage bitmap that is used as an opacity mask to which a brush can be applied to render graphics. These techniques may suffer from distortion when a coverage bitmap is scaled, and may also increase GPU memory costs significantly for larger geometries.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for anti-aliasing for geometries are described. In at least some embodiments, a graphical image is reduced to a collection of polygonal geometric primitives ("geometries"). The individual geometries are processed according to techniques discussed herein such that anti-aliasing is applied to the geometries when the geometries are displayed as part of the graphical image. Generally, aliasing refers to a jagged appearance of lines in an image, such as edges of a bitmap image. Anti-aliasing refers to processing and/or effects that can be applied to portions of an image (e.g., geometries) to remove and/or reduce aliasing. Techniques discussed herein provide for anti-aliasing of a general-purpose geometry via an associated collection of quadrilaterals and bevels that can be dynamically transformed when the geometry is rendered for display. In at least some embodiments, quadrilaterals and bevels generated for a geometry enable the geometry to be dynamically transformed and re-rendered multiple times to achieve a variety of visuals.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
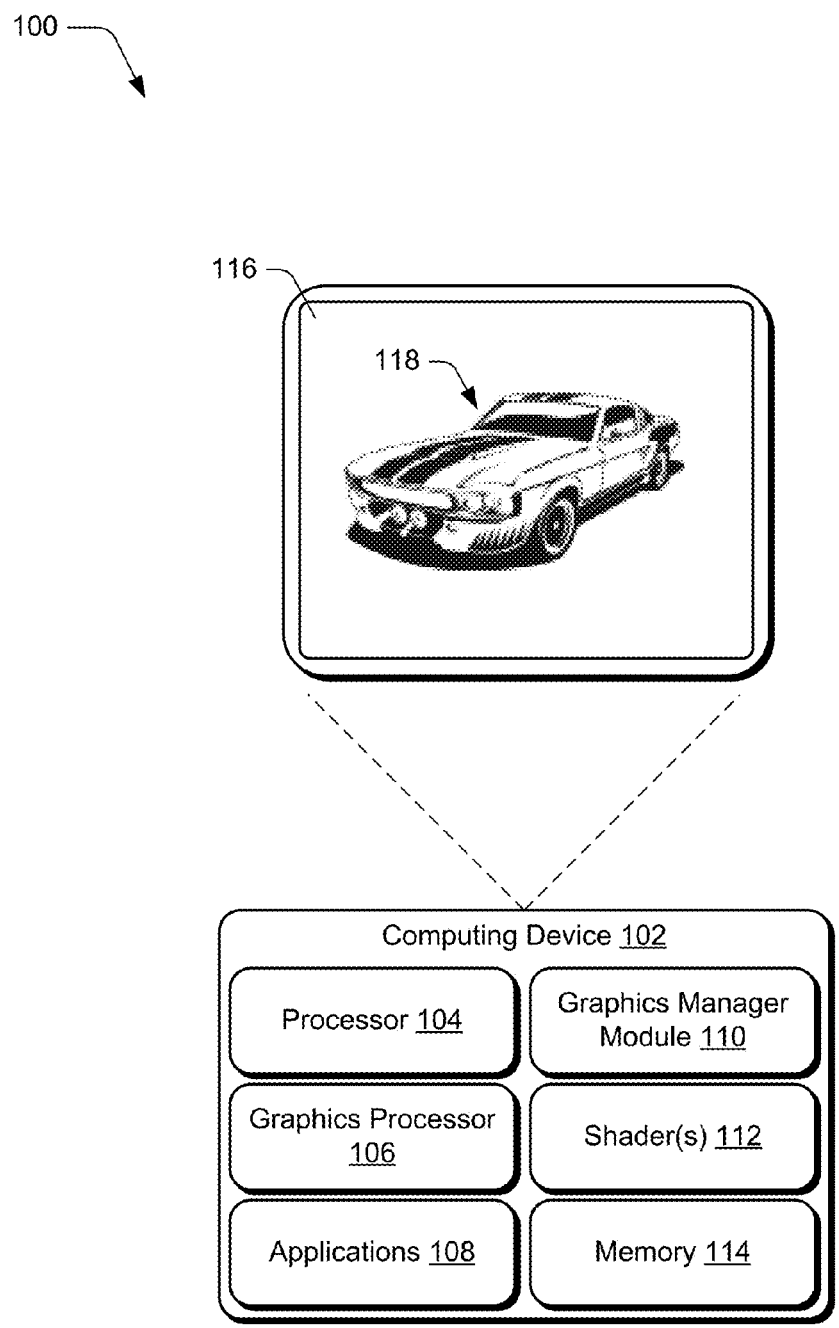
FIG. 1 is an illustration of an environment in an example implementation that is operable to employ techniques discussed herein.

Techniques for anti-aliasing for geometries are described. In at least some embodiments, a graphical image is reduced to a collection of polygonal geometric primitives ("geometries"). The individual geometries are processed according to techniques discussed herein such that anti-aliasing is applied to the geometries when the geometries are displayed as part of the graphical image. Generally, aliasing refers to a jagged appearance of lines in an image. In this context, for example, aliasing refers to visual artifacts seen on the edges of geometric primitives rendered on a 1-bit monochrome device. Anti-aliasing refers to processing and/or effects that can be applied to portions of an image (e.g., primitives) to remove and/or reduce aliasing.

In at least some embodiments, techniques involve a number of processing steps to achieve anti-aliasing of a geometry. For example, edge unit normal vectors are calculated for edges of a geometry. The geometry is then tessellated into a set of interior triangles. A processed geometry is generated by insetting vertices of the geometry by a displacement amount calculated based on the edge unit normal vectors. Generally, the processed geometry is an inset version of the original geometry.

Further to various embodiments, alpha ramp quadrilaterals ("quads") are generated for edges of the geometry. The quads are generated based on the edge unit normal vectors for respective edges of the geometry, and based on displacement vectors calculated using the edge unit normal vectors. Individual quads include a pixel coverage gradient that is applied across an edge of the quad and that specifies a transition from opaque or semi-opaque at one edge of the quad, to transparent at another edge of the quad. In at least some embodiments, the pixel coverage gradient enables anti-aliasing of a displayed geometry.

Further to various embodiments, alpha ramp bevels ("bevels") are generated for convex vertices of the geometry. The bevels are generated to fill gaps that may occur between quads and to ensure that anti-aliasing is evenly applied across an associated geometry. Individual bevels include a pixel coverage gradient that is applied across a surface of the bevels and that specifies a transition from opaque or semi-opaque at a vertex of the quad, to transparent at an edge of the quad.

In at least some embodiments, a processed geometry and associated quads and bevels are further processed to apply coverage (e.g., opacity) values and color values. The processed geometry, quads, and bevels can then be displayed as a visually integrated geometry (e.g., integrated with other geometries of an image) and with anti-aliasing provided by the quads and bevels. Thus, techniques discussed herein provide for anti-aliasing of a general-purpose geometry via an associated collection of quads and bevels that can be dynamically transformed when the geometry is rendered for display. In at least some embodiments, quadrilaterals and bevels generated for a geometry enable the geometry to be dynamically transformed and re-rendered multiple times to achieve a variety of visuals.

In the following discussion, an example environment is first described that is operable to employ techniques described herein. Next, a section entitled "Example Implementation Scenario" describes an example implementation scenario in accordance with one or more embodiments. Following this, a section entitled "Example Procedures" describes some example methods in accordance with one or more embodiments. Next, a section entitled "Additional Embodiments" describes different scenarios in which techniques discussed herein may be employed. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for anti-aliasing for geometries described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device (e.g., a tablet), and so forth as further described in relation to FIG. 15.

Computing device 102 includes a processor 104, which is representative of functionality to perform various types of data processing for the computing device 102. For example, the processor 104 can represent a central processing unit (CPU) of the computing device 102. Further examples of implementations of the processor 104 are discussed below with reference to FIG. 15.

Further illustrated is a graphics processor 106, which is representative of functionality to perform various graphics-related tasks for the computing device 102. The graphics processor 106, for example, can represent a graphics processing unit (GPU) of the computing device 102.

The computing device 102 further includes applications 108 and a graphics manager module 110. The applications 108 are representative of functionalities to perform various tasks via the computing device 102. Examples of the applications 108 include a word processor application, an email application, a content editing application, a web browsing application, and so on.

The graphics manager module 110 is representative of functionality to perform various tasks further to techniques for anti-aliasing for geometries discussed herein. The graphics manager module 110, for instance, can be implemented as a component of an operating system for the computing device 102. Embodiments, however, can employ a variety of different configurations and implementations of the graphics manager module 110. Further details concerning implementation of the graphics manager module 110 are discussed below.

The computing device 102 further includes one or more shader modules 112, which are representative of functionality to apply various visual effects to graphics, such as shading, special effects, post-processing, and so forth. In at least some embodiments, the shader modules 112 can include a vertex shader, which is representative of functionality to process vertices of a geometry to produce output vertices that can be further processed and/or displayed. The shader modules 112 may further include a pixel shader, which is representative of functionality to apply various visual effects to pixels, such as based on opacity and/or color values for pixels. In at least some embodiments, vertices that are processed by the vertex shader can be passed to the pixel shader such that color and coverage values can be applied to pixels of the vertices prior to display.

The computing device 102 further includes a memory 114, which is representative of a data storage medium that can be written to and read from by various functionalities of the computing device 102. The memory 114, for example, can represent a primary memory of the computing device 102. Further details and examples of the memory 114 are discussed below with reference to FIG. 15.

A display device 116 is also illustrated, which is configured to output graphics for the computing device 102. For instance, consider an example implementation where one of the applications 108 is currently running and submits graphic elements of the application 108 to be displayed via the display device 116. Utilizing the processor 104 and/or the graphics processor 106, the graphics manager module 110 can implement techniques discussed herein to apply anti-aliasing to various geometries.

Displayed on the display device 116 is a graphical image 118, which has been processed according to techniques discussed herein. For example, the graphical image 118 is composed of multiple geometries that can be generated and processed as discussed below.

Having described an example environment in which the techniques described herein may operate, consider now an example implementation scenario in accordance with one or more embodiments.

Example Implementation Scenario

The following discussion describes portions of an example implementation scenario for techniques for anti-aliasing for geometries described herein. The example implementation scenario may be implemented in the environment 100 of FIG. 1, the system 1500 of FIG. 15, and/or any other suitable environment. Generally, the implementation scenario is described as a series of operations that can be performed as part of rendering a primitive as part of a larger graphical image to be displayed.

Figure 2:
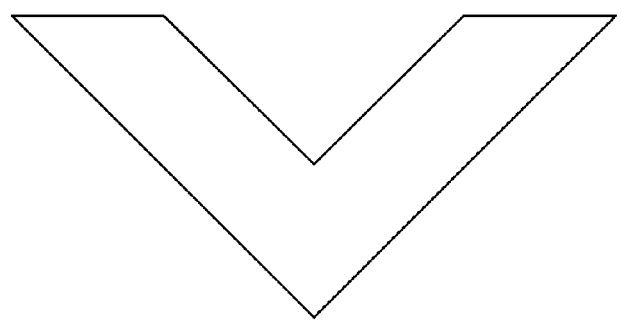
FIG. 2 illustrates a portion of an example implementation scenario in accordance with one or more embodiments.

FIG. 2 illustrates a geometry 200 in accordance with one or more embodiments. In at least some implementations, the geometry 200 represents a polygon that is generated as part of an initial graphics realization operation. For instance, the geometry 200 can be a data representation of a graphics primitive that is generated by using known algorithms for geometry flattening and removal of self-intersecting lines from the geometry. Generally, flattening refers to replacing geometries containing Beziers and/or other curved segments with appropriate polygonal approximations. The geometry 200 can be included as part of graphics data submitted for display, such as from the applications 108.

Figure 3:
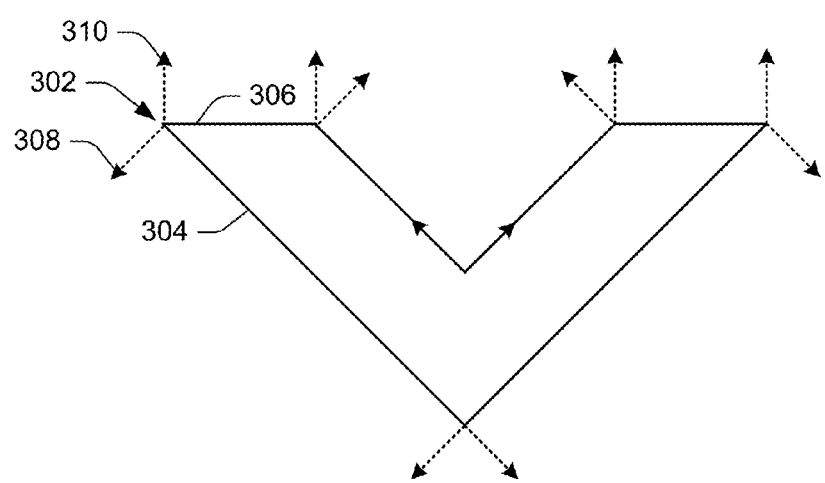
FIG. 3 illustrates a portion of an example implementation scenario in accordance with one or more embodiments.

FIG. 3 illustrates that edge normal vectors are calculated and annotated for the edges of the geometry 200 to generate an annotated geometry 300. For example, an outward facing edge unit normal vector (e.g., with a length of 1) is calculated for each edge of the geometry 200. Each vertex of the geometry 200 is then annotated with the normal of the incoming and outgoing segments to generate the annotated geometry 300. The unit normal vectors are illustrated in FIG. 3 as dashed arrows at each vertex of the annotated geometry 300.

For instance, consider a vertex 302 of the annotated geometry 300. The vertex 302 includes an incoming edge 304 and an outgoing edge 306. An edge normal vector for the incoming edge 304 is calculated and annotated as a normal vector 308. An edge normal vector for the outgoing edge 306 is calculated and annotated as a normal vector 310.

As illustrated, edge normal vectors for the remaining vertices are calculated and annotated on their respective vertices of the annotated geometry 300.

Figure 4:
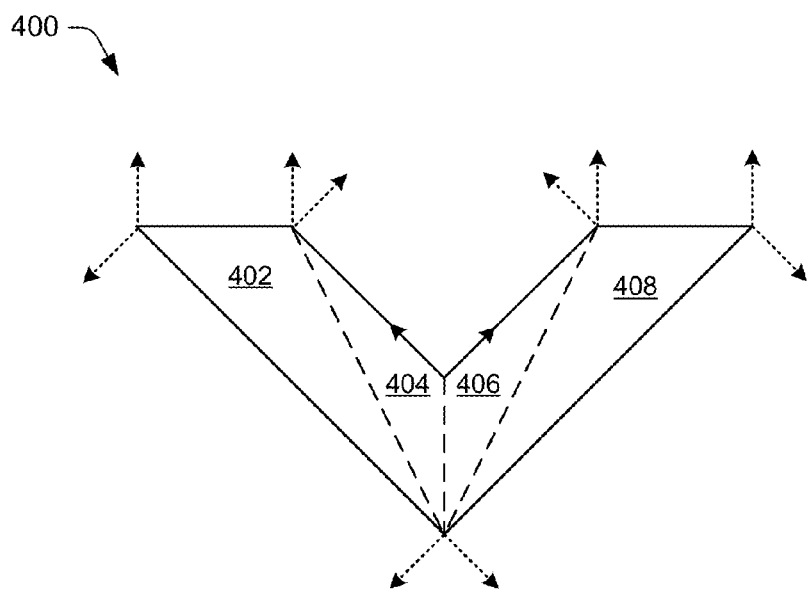
FIG. 4 illustrates a portion of an example implementation scenario in accordance with one or more embodiments.

FIG. 4 illustrates that an interior tessellation is performed on the annotated geometry 300 to generate a tessellated geometry 400. Generally, generating the tessellated geometry 400 involves dividing the geometry into a set of "watertight" triangles. In this particular example, the tessellated geometry 400 includes triangles 402, 404, 406, and 408. However, a variety of different arrangements of interior triangles can be employed in accordance with various embodiments.

Any suitable tessellation algorithm may be employed to generate the tessellated geometry 400. Some constraints, however, may be applied that specify how tessellation is implemented. Examples of some constraints that may govern how a geometry is tessellated include:

(1) Interior triangles are to include only vertices that exist in an original pre-tessellated geometry.

(2) No triangles in a tessellated geometry may overlap.

(3) The tessellation is to be "watertight." For example, any two triangles sharing an edge are to share the entire edge and include no T-junctions. Generally, a T-junction occurs when two triangles share less than an entire edge.

Notice that in the tessellated geometry 400, annotation of the previously-calculated edge normal vectors is persisted.

Figure 5:
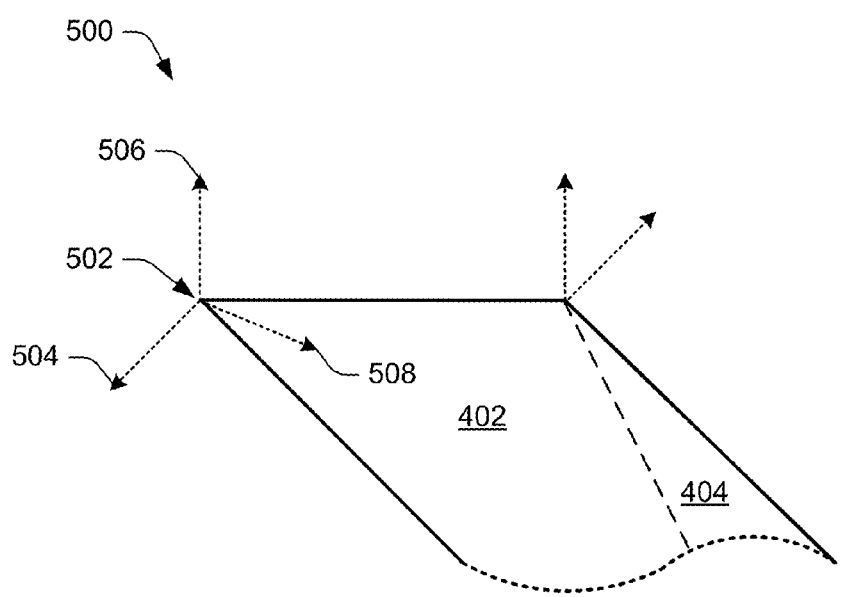
FIG. 5 illustrates a portion of an example implementation scenario in accordance with one or more embodiments.

FIG. 5 illustrates a portion 500 of the tessellated geometry 400 in accordance with one or more embodiments. In various embodiments, each of the vertices of the triangles produced in the tessellated geometry 400 is associated with at least three pieces of data that can be used to perform further processing:

(1) A position (e.g., X and Y coordinates) of the vertex.

(2) An edge normal for the incoming edge of the vertex, e.g., as illustrated above.

(3) An edge normal for the outgoing edge of the vertex, e.g., as illustrated above.

For example, consider a vertex 502 of the portion 500. The vertex 502 includes an incoming edge normal vector ("incoming vector") 504, and an outgoing edge normal vector ("outgoing vector") 506. For purposes of the various processing discussed below, the incoming vector 504 is annotated as "inNormal," and the outgoing vector 506 is annotated as "outNormal."

Further to the processing discussed below, a displacement vector 508 is calculated for the vertex 502. The displacement vector 508 is calculated as an average function of the incoming vector 504 and the outgoing vector 506. One example equation for calculating the displacement vector is:

$$-\mathrm{norm}(\mathrm{inNormal}+\mathrm{outNormal}), \text{ where } \mathrm{norm}(\hat{v})=v/|v|$$

Thus, the displacement vector 508 is the negative angle bisector of the vertex 502. For example, for each vertex, a displacement vector can be determined by taking a negative average of the incoming vector and outgoing vector. As further detailed below, this calculation can be performed to determine a displacement vector for each vertex.

Figure 6:
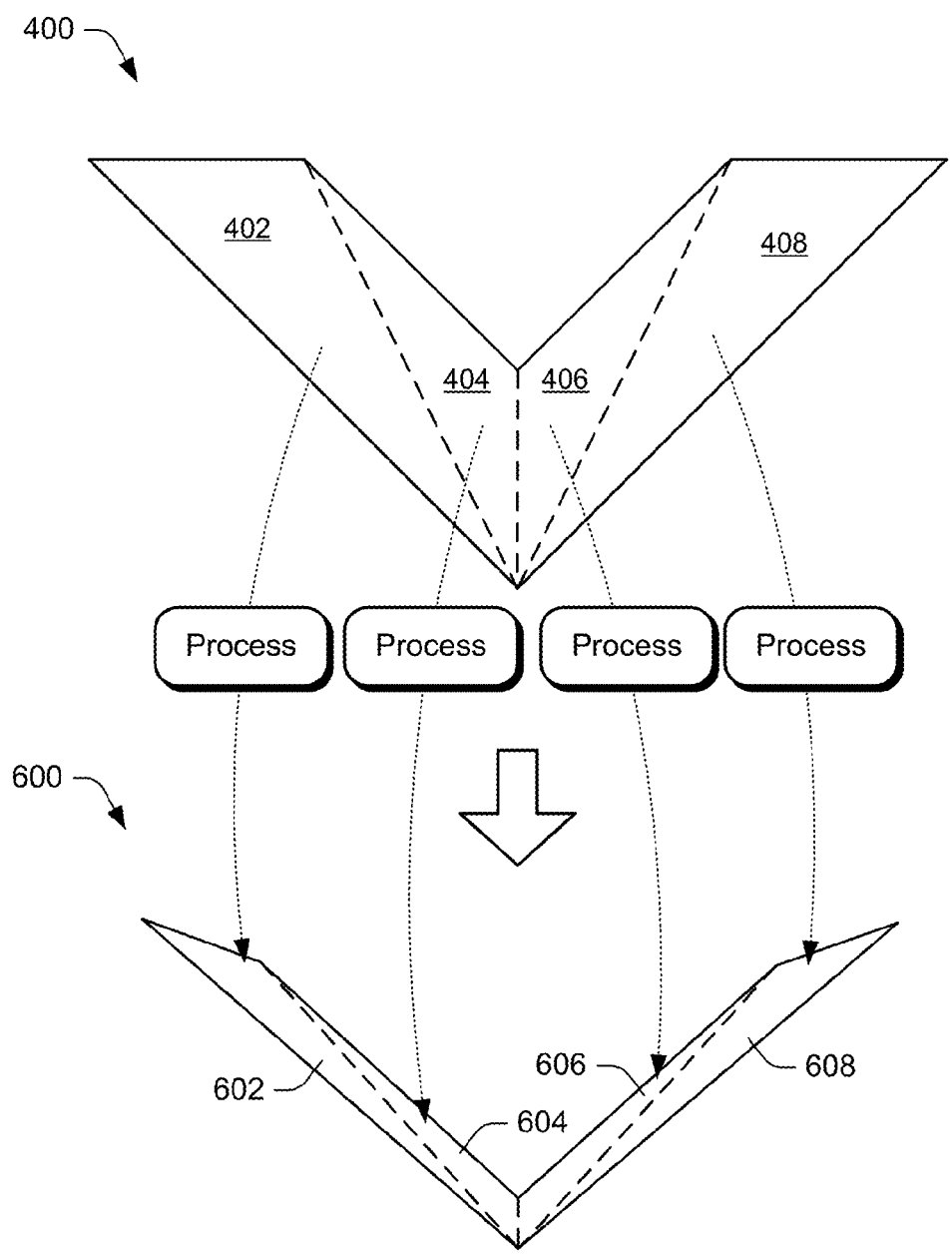
FIG. 6 illustrates a portion of an example implementation scenario in accordance with one or more embodiments.

FIG. 6 illustrates that the tessellated geometry 400 is further processed to generate a processed geometry 600. To generate the processed geometry, the triangles calculated for the tessellated geometry 400 are further processed into a new set of triangles for the processed geometry 600, with each vertex of each triangle including of the following data:

(1) The vertex's "anchor." Generally, the anchor of a vertex refers to the point at which the two lines of the vertex meet.

(2) A "displacement" vector (e.g., calculated as discussed above and below).

(3) A "coverage" value, set to either 0 (zero) or 1 (one). Generally, a coverage of 0 means that the vertex is transparent and a coverage of 1 means that the vertex is opaque.

For each vertex for each of the triangles of the processed geometry 600, the combination of each vertex's "anchor" and "displacement" (along with the render transform, described later) indicates the vertex's position when rendered.

Each of the triangles is then processed as follows:

Let (v1,v2,v3) represent the vertices of the pre-processed triangle, e.g., for each of the interior triangles of the tessellated geometry 400 illustrated in FIG. 4. The triangle is converted into a processed triangle with the following vertices:

Vertex 1 defined by:
(1) Anchor: $v1_{pos}$
(2) Displacement: $-\mathrm{norm}(v1_{inNormal}+v1_{outNormal})$
(3) Coverage: 1

Vertex 2 defined by:
(1) Anchor: $v2_{pos}$
(2) Displacement: $-\mathrm{norm}(v2_{inNormal}+v2_{outNormal})$
(3) Coverage: 1

Vertex 3 defined by:
Anchor: $v3_{pos}$
Displacement: $-\mathrm{norm}(v3_{inNormal}+v3_{outNormal})$
Coverage: 1

Where: "inNormal" refers to the edge normal calculated above for the incoming edge of each vertex; "outNormal" refers to the edge normal calculated for the outgoing edge of each vertex; and "Anchor" refers to the original position of the vertex prior to processing.

As illustrated in FIG. 6, generating the processed geometry 600 involves insetting the interior triangles generated for the tessellated geometry 400 by shifting the vertices of the triangles inward using the displacement vectors calculated according to the algorithm above.

For instance, the triangle 402 is processed as discussed above to generate a processed triangle 602; the triangle 404 is processed to generate a processed triangle 604; the triangle 406 is processed to generate a processed triangle 606; and the triangle 408 is processed to generate a processed triangle 608.

In addition to generating the processed geometry 600, anti-aliasing information for the tessellated geometry 400 can be generated. For example, consider the following discussion.

Figure 7:
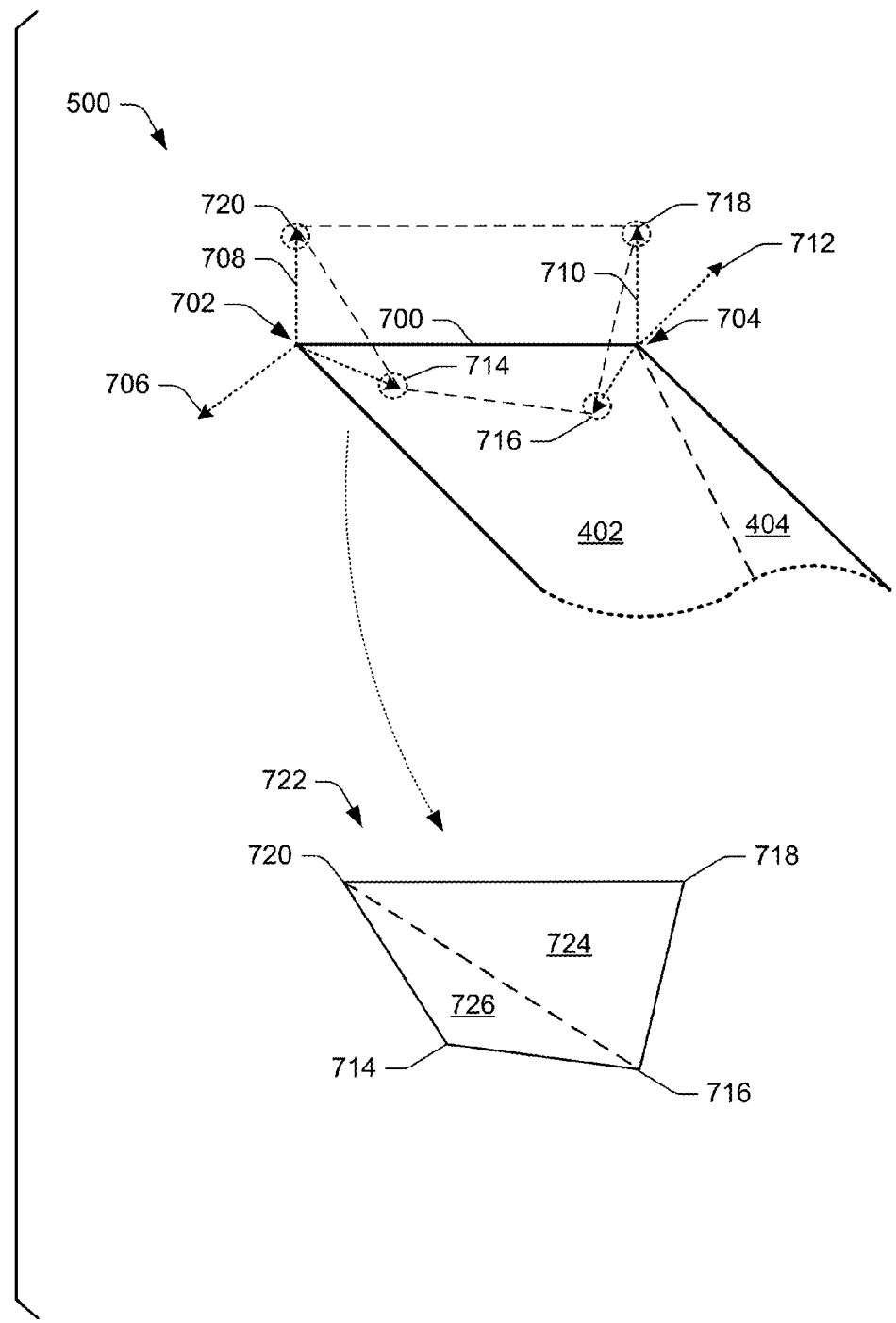
FIG. 7 illustrates a portion of an example implementation scenario in accordance with one or more embodiments.

FIG. 7 illustrates that "alpha ramp quads" ("quads") are generated for each interior triangle of the tessellated geometry 400. Generally, a quad is a set of two abutting triangles that form a quadrilateral that can be used to apply anti-aliasing during rendering of a geometry. In at least some embodiments, quads can be generated according to the following algorithm:

For each edge (va,vb) of a triangle that corresponds to an outer boundary edge of the tessellated geometry 400, a quad consisting of two triangles with the following vertices is emitted:

Vertex 1 defined by:
Anchor: $va_{pos}$,
Displacement: $-\text{norm}(va_{inNormal}+Va_{outNormal})$
Coverage: 1
Vertex 2 defined by:
Anchor: $vb_{pos}$
Displacement: $-\text{norm}(vb_{inNormal}+Vb_{outNormal})$
Coverage: 1
Vertex 3 defined by:
Anchor: $vb_{pos}$
Displacement: $vb_{inNormal}$
Coverage: 0
Vertex 4 defined by:
Anchor: $va_{pos}$
Displacement: $va_{outNormal}$
Coverage: 0

For instance, consider an outer edge 700 of the triangle 402 of the portion 500 of the tessellated geometry 400, introduced above. The outer edge 700 includes a vertex 702, which corresponds to "va" in the algorithms discussed above and below. The outer edge further includes a vertex 704, which corresponds to "vb" in the algorithms discussed above and below.

The vertex 702 includes an incoming vector ("$va_{inNormal}$") 706 and an outgoing vector ("$va_{outNormal}$") 708. The vertex 704 includes an incoming vector ("$vb_{inNormal}$") 710 and an outgoing vector ("$vb_{outNormal}$") 712.

Thus, vertices for a quad for the outer edge 700, according to the algorithm discussed above, would be as follows:

(1) A vertex 714 defined by the anchor point of the vertex 702 and the displacement vector $-\text{norm}(va_{inNormal}+Va_{outNormal})$, and with a coverage of 1.

(2) A vertex 716 defined by the anchor point of the vertex 704 and the displacement vector $-\text{norm}(vb_{inNormal}+Vb_{outNormal})$, and with a coverage of 1.

(3) A vertex 718 defined by the anchor point of the vertex 704 as displaced by the incoming vector 710 (e.g., $vb_{inNormal}$) and with a coverage of 0.

(4) A vertex 720 defined by the anchor point of the vertex 702 as displaced by the outgoing vector 708 (e.g., $va_{outNormal}$) and with a coverage of 0.

Thus, these vertices are used to define a quad 722 for the outer edge 700. The quad 722 consists of a triangle 724 and a triangle 726 that share a common edge.

This process of generating quads can proceed for each outer edge of the tessellated geometry 400 such that each outer edge has a corresponding quad. As illustrated below, quads generated for a geometry enable anti-aliasing for a geometry when the geometry is drawn for display.

Figure 8:
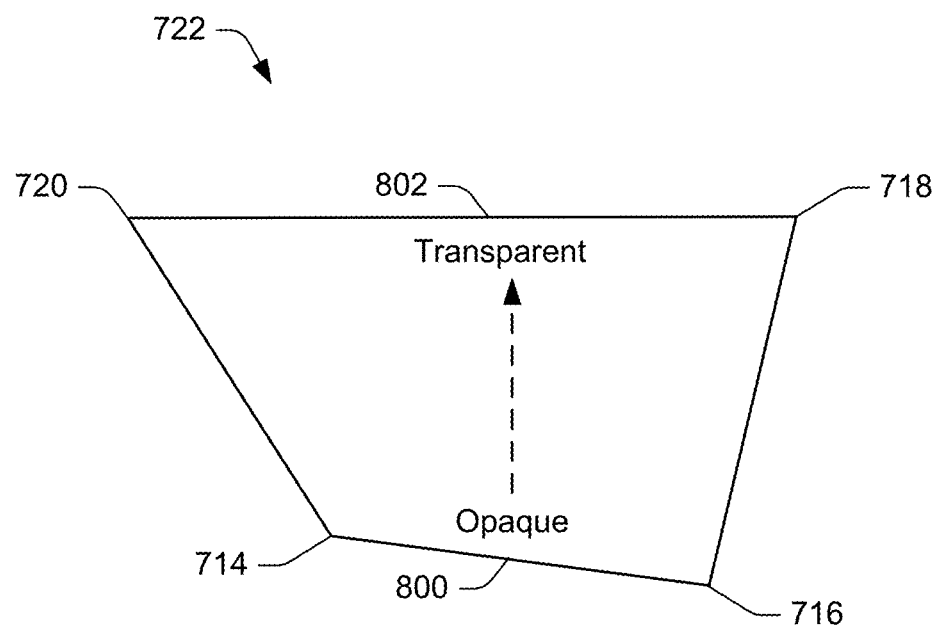
FIG. 8 illustrates a portion of an example implementation scenario in accordance with one or more embodiments.

FIG. 8 illustrates coverage information for the quad 722 generated above. As mentioned above, the vertices 714, 716 have coverage values of 1, and are thus opaque. Further, the vertices 718, 720 have coverage values of 0, and are thus transparent. Accordingly, the quad 722 defines a coverage gradient that transitions from opaque or semi-opaque at its inner edge 800 to transparent at its outer edge 802. In at least some embodiments, the transition from opaque or semi-opaque to transparent can occur at a constant rate. A similar coverage gradient can apply to the remaining quads generated for the other edges of the tessellated geometry 400.

In at least some embodiments, quads are generated according to a particular width, e.g., a width of one pixel. Thus, when an associated geometry is scaled up and/or scaled down, quads for the geometry can maintain their specified width to enable anti-aliasing provided by the quads to remain consistent.

Figure 9:
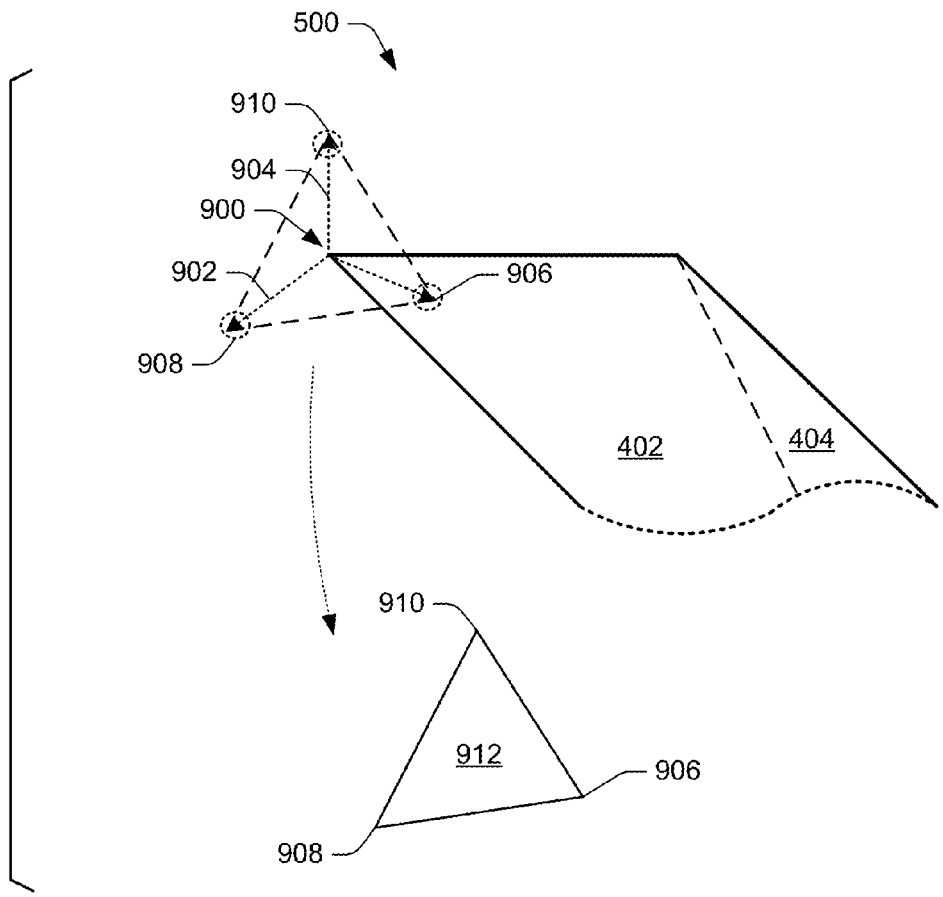
FIG. 9 illustrates a portion of an example implementation scenario in accordance with one or more embodiments.

FIG. 9 illustrates that in at least some embodiments, for each convex vertex of the tessellated geometry 400, a "bevel alpha ramp" ("bevel") is generated. Generally, a bevel is a triangle that has a particular coverage profile. As will become more apparent below, bevels serve to fill in gaps that may occur between adjacent quads.

For each convex vertex of the tessellated geometry 400, a bevel with the following vertices is emitted:

Vertex 1 defined by:
Anchor: $v_{pos}$
Displacement: $-\text{norm}(v_{inNormal}+v_{outNormal})$
Coverage: 1
Vertex 2 defined by:
Anchor: $v_{pos}$
Displacement: $v_{inNormal}$
Coverage: 0
Vertex 3 defined by:
Anchor: $v_{pos}$
Displacement: $v_{inNormal}$
Coverage: 0

For instance, consider a vertex 900 of the triangle 402 of the portion 500 of the tessellated geometry 400, introduced above. The vertex 900 ("$v_{pos}$") includes an incoming vector 902 ("$v_{inNormal}$") and an outgoing vector 904 ("$v_{outNormal}$"). A bevel for the vertex 900 is generated using the following vertices:

(1) A vertex 906 defined by the anchor point of the vertex 900 and the displacement vector $-\text{norm}(v_{inNormal}+v_{outNormal})$ and with a coverage of 1.

(2) A vertex 908 defined by the anchor point of the vertex 900 and the incoming vector 902 ($v_{inNormal}$) and with a coverage of 0.

(3) A vertex 910 defined by the anchor point of the vertex 900 and the outgoing vector 904 ($v_{inNormal}$) and with a coverage of 0.

Thus, these vertices define a bevel 912 for the vertex 900.

Figure 10:
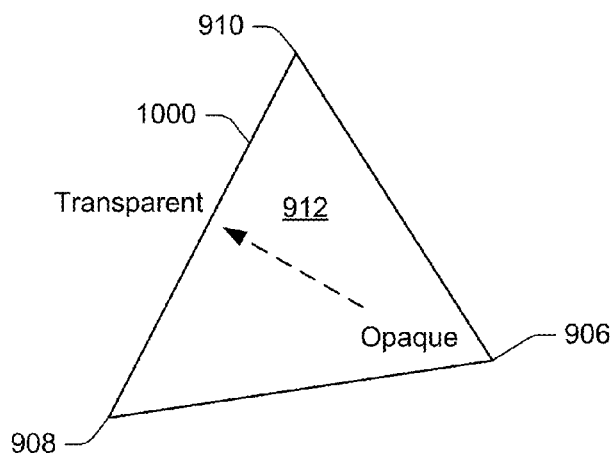
FIG. 10 illustrates a portion of an example implementation scenario in accordance with one or more embodiments.

FIG. 10 illustrates coverage information for the bevel 912 generated above. As indicated above, the vertex 906 has a coverage value of 1, and is thus opaque or semi-opaque. The vertices 908, 910 have coverage values of 0, and are thus transparent. Accordingly, the bevel 912 defines a coverage gradient that transitions from opaque or semi-opaque at the vertex 906, to transparent at an edge 1000 between the vertices 908, 910. In at least some embodiments, the transition from opaque or semi-opaque to transparent can occur at a constant rate. A similar coverage gradient can apply to the remaining bevels generated for the other convex vertices of the tessellated geometry 400.

In at least some embodiments, bevels are generated according to a particular width, e.g., a width of one pixel. Thus, when an associated geometry is scaled up and/or scaled down, bevels for the geometry can maintain their specified width to enable anti-aliasing provided by the bevels to remain consistent.

Figure 11:
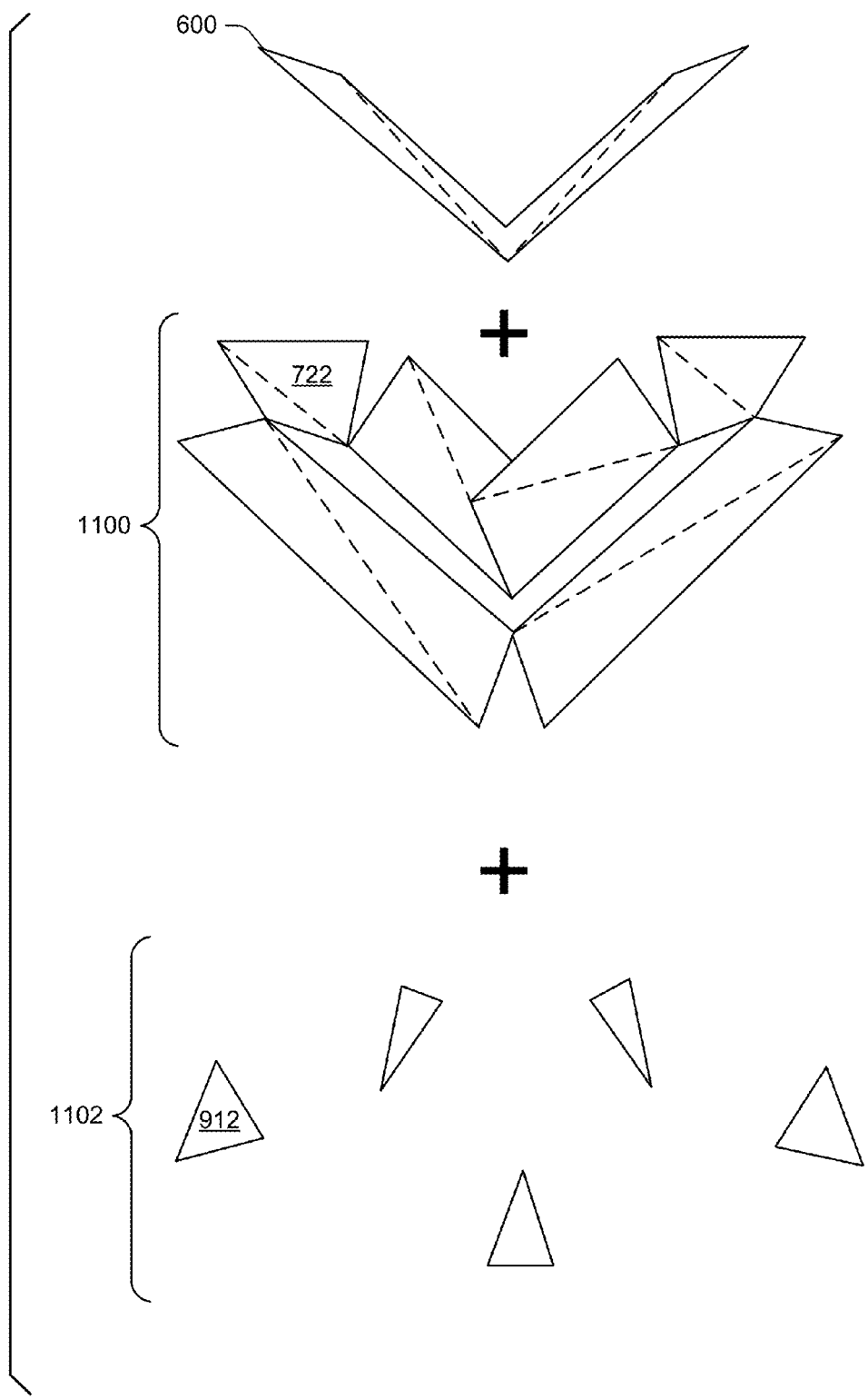
FIG. 11 illustrates a portion of an example implementation scenario in accordance with one or more embodiments.

FIG. 11 illustrates that the processed geometry, quads, and bevels generated above can be combined to generate a realization that can be drawn as discussed below. The upper portion of FIG. 11 illustrates the processed geometry 600, generated as discussed above.

The center portion of FIG. 11 illustrates a quad set 1100 generated for the tessellated geometry 400, including the quad 722 discussed above. For instance, the individual quads of the quad set 1100 correspond to quads generated for each edge of the tessellated geometry 400.

The lower portion of FIG. 11 illustrates a bevel set 1102 generated for the tessellated geometry 400, including the bevel 912 discussed above. For instance, the individual bevels of the bevel set 1102 correspond to bevels generated for the convex vertices of the tessellated geometry 400.

Figure 12:
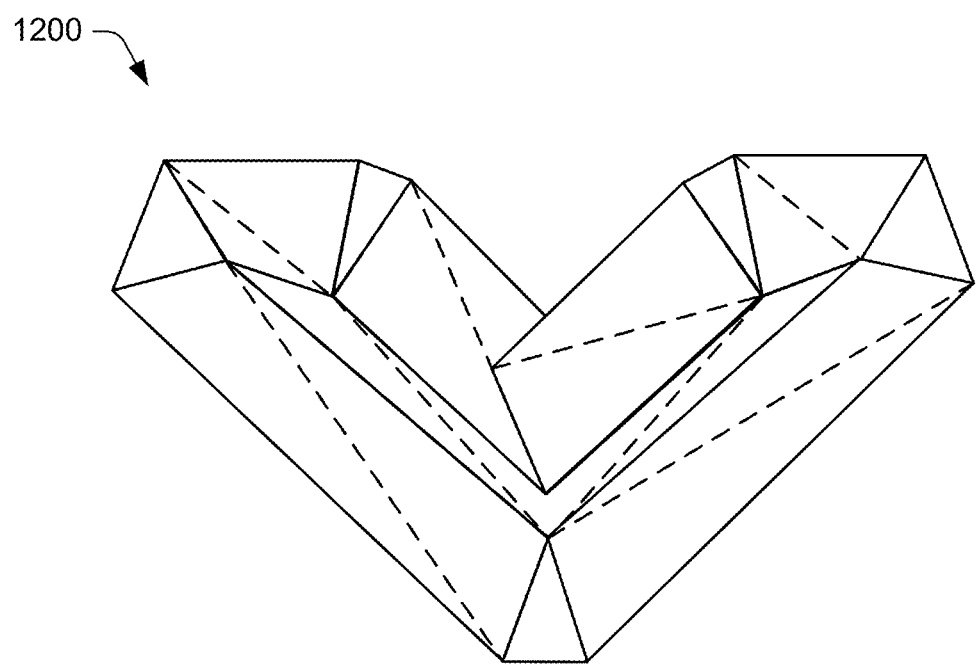
FIG. 12 illustrates a portion of an example implementation scenario in accordance with one or more embodiments.

FIG. 12 illustrates that the processed geometry 600, the quad set 1100, and the bevel set 1102 combine to form an integrated realization 1200 that can be drawn and displayed. Consider that the processed geometry 600 is opaque. Further, the quads and bevels define a gradient from opaque or semi-opaque adjacent to the processed geometry 600, to transparent at their outer edges. Thus, the quads and bevels provide anti-aliasing for the original geometry 200 when the geometry 200 is rendered. Further, since they are based on the attributes of an underlying geometry (e.g., the vertices and/or normal vectors), the quads and bevels are scale independent and thus provide visually consistent anti-aliasing for a variety of transformations that can be applied to the underlying geometry.

Having described an example implementation scenario in which techniques described herein may operate, consider now an example procedure in accordance with one or more embodiments.

Example Procedures

The following discussion describes some example procedures for anti-aliasing for geometries in accordance with one or more embodiments. The example procedures may be employed in the environment 100 of FIG. 1, the system 1500 of FIG. 15, and/or any other suitable environment.

Figure 13:
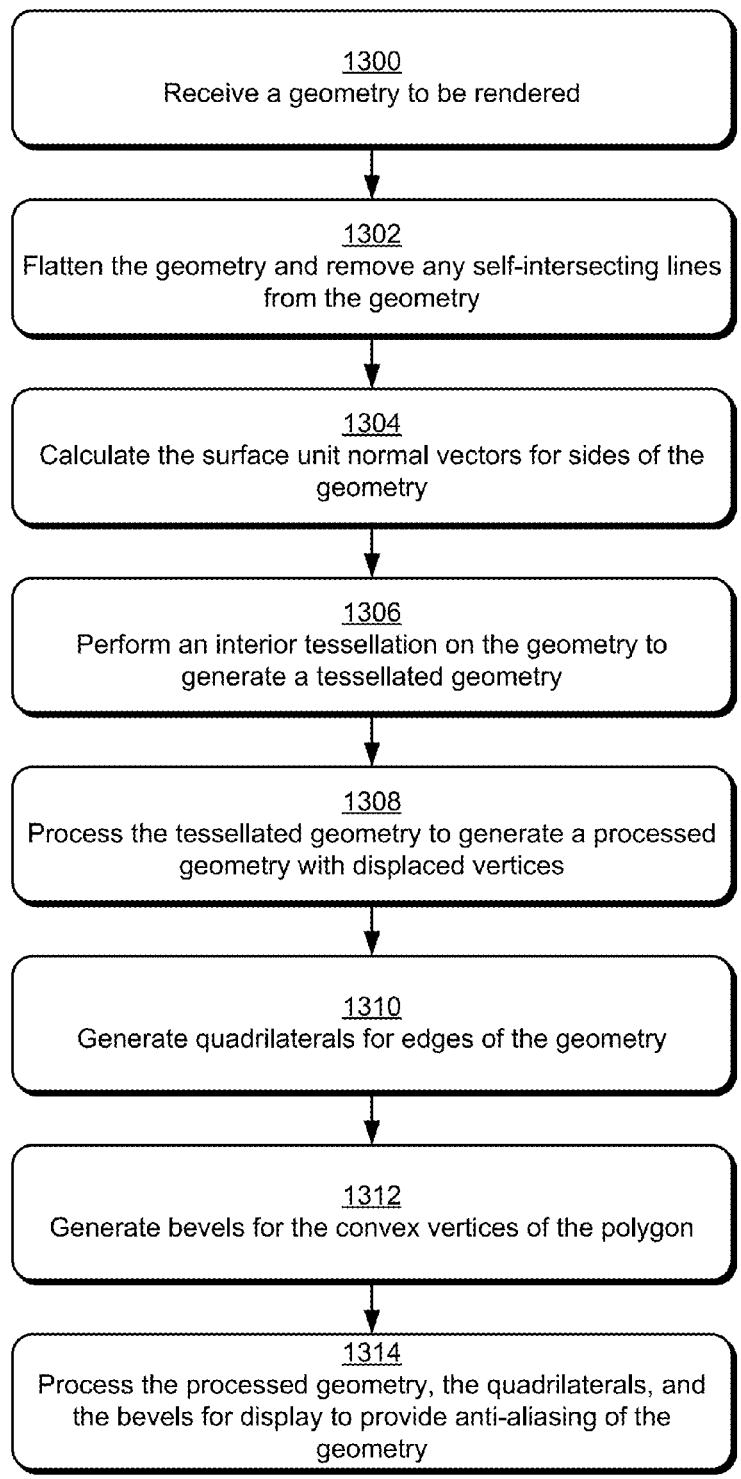
FIG. 13 is a flow diagram that describes steps in a method in accordance with one or more embodiments.

FIG. 13 is a flow diagram that describes steps in a method in accordance with one or more embodiments. In at least some embodiments, the method describes an example realization process for rendering a geometry. Step 1300 receives a geometry to be rendered. The geometry, for example, can correspond to a primitive and/or collection of primitives received from an application and as part of a graphic image for display.

Step 1302 flattens the geometry and removes any self-intersecting lines from the geometry. For example, if the geometry includes any higher-level shapes (e.g., arcs, Beziers, and so forth), these shapes are "flattened" into polygonal approximations of the shapes.

Step 1304 calculates the edge unit normal vectors for sides of the geometry. Example implementations for calculating the unit normal vectors are discussed above. As discussed above, the vertices of the geometry are annotated with the unit normal vectors for the incoming and outgoing line segments.

Step 1306 performs an interior tessellation on the geometry to generate a tessellated geometry. As discussed above, the interior tessellation involves dividing the geometry into interior triangles. Example criteria for an interior tessellation are discussed above.

Step 1308 processes the tessellated geometry to generate a processed geometry with displaced vertices. As indicated above, processing a tessellated geometry includes adjusting positions of vertices of the tessellated geometry according to various algorithms. For example, the vertices of the triangles of the tessellated geometry can be displaced inwardly by a displacement value to generate an inset geometry. An example algorithm for determining a displacement vector for a displacement value is discussed above.

Step 1310 generates quadrilaterals for edges of the geometry. For example, quads for each boundary edge of the geometry can be generated as discussed above.

Step 1312 generates bevels for the convex vertices of the polygon. Example ways for generating such bevels are detailed above.

Step 1314 processes the processed geometry, the quadrilaterals, and the bevels for display to provide anti-aliasing of the geometry. In at least some embodiments, the processing can include converting the processed geometry, the quadrilaterals, and the bevels into a renderable data type. For example, the processed geometry, the quadrilaterals, and the bevels can be rasterized for display. Example ways of processing the processed geometry, the quadrilaterals, and the bevels are discussed below.

Figure 14:
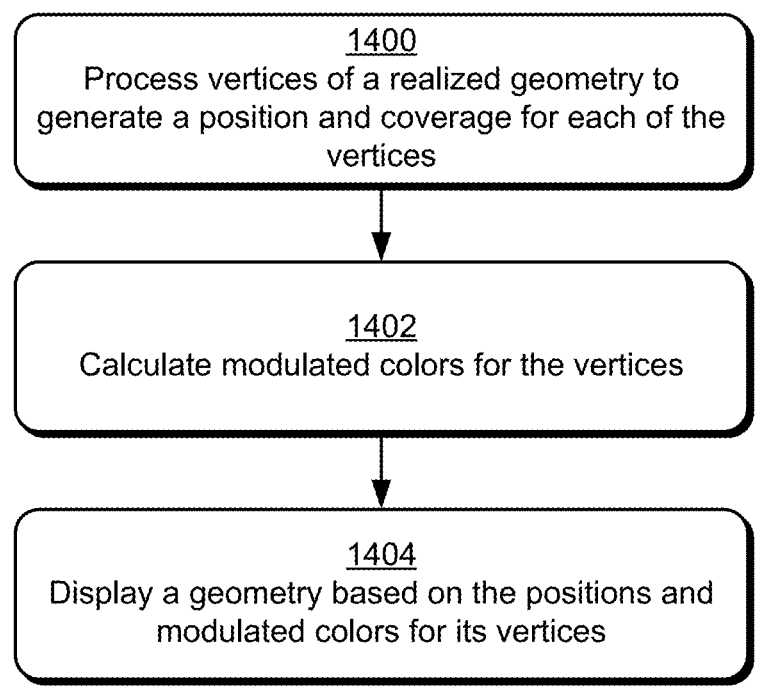
FIG. 14 is a flow diagram that describes steps in a method in accordance with one or more embodiments.

FIG. 14 is a flow diagram that describes steps in a method in accordance with one or more embodiments. In at least some embodiments, the method describes an example rasterization process for rendering a geometry, such as a geometry that has been realized via the process discussed with reference to FIG. 13.

Step 1400 processes vertices of a realized geometry to generate a position and coverage for each of the vertices. An example of a realized geometry is discussed above with reference to the integrated realization 1200. Thus, vertices of the processed geometry 600, the quad set 1100, and the bevel set 1102 can be processed as discussed below. In at least some embodiments, the vertices can be processed by a suitable vertex shader, such as included as part of the shader modules 112 of the environment 100.

In at least some embodiments, processing a particular vertex utilizes an original position of the vertex, e.g., the anchor position discussed above. A calculated displacement vector and coverage value are also utilized, examples of which are discussed above. A position for the vertex can then be calculated using the formula:

$$\text{Position} = v_{anchor} * M + \frac{v_{displacement} * M'}{2|v_{displacement} * M'|}$$

Where M is a 3×2 affine matrix, an example of which is known as the world transformation; M' is the 3×2 affine matrix with its translational components set to 0 (zero); $v_{anchor}$ is the original position of the anchor point for the vertex;

and $v_{displacement}$ is the calculated displacement vector for the vertex. In at least some embodiments, since $v_{displacement}*M'$ is normalized to a unit vector in the above formula, some implementations may skip the normalization of $v_{displacement}$ itself performed in the previous section during realization.

According to various embodiments, the calculations mentioned above can be performed in a variety of ways. For instance, vertices of a realization may be transformed at draw time on a CPU, and displacement vectors may be normalized on a GPU. Alternatively, both the transform and the normalization can be performed on the CPU. As yet another embodiment, an anchor point and a displaced anchor point can be stored in a realization, and the displacement can be calculated via a vertex shader, e.g., of the shader modules 112.

Step 1402 calculates modulated colors for the vertices. For example, for each vertex, a coverage value can be determined as discussed above. A brush is determined for each vertex, such as ascertained from graphics data defined for a vertex. Generally, a brush specifies a particular color value (e.g., a red green blue (RGB) value) for a particular pixel covered by a geometry. A modulated color can be calculated by multiplying the brush value by the determined coverage value for a pixel coincident with a vertex. For example, a pixel coincident with a vertex with a coverage value of 0 is transparent, while a pixel coincident with a vertex with a coverage value of 1 is opaque and colored via an associated brush value. A variety of coverage values between 0 and 1 can be employed, such as partially opaque, partially transparent, and so on.

Step 1404 displays a geometry based on the positions and modulated colors for its vertices. For example, the rasterized geometry can be submitted to a display functionality for display on a computing device.

In at least some embodiments, quadrilaterals and bevels generated for a geometry enable the geometry to be dynamically transformed and re-rendered multiple times to achieve a variety of visuals.

Additional Embodiments

Techniques for anti-aliasing for geometries discussed herein may be employed in a variety of different scenarios. For instance, the techniques can be employed for anti-aliasing of geometries that are transformed via a perspective transformation, additionally or alternatively to the affine transformation discussed above. The techniques may also be employed to apply anti-aliasing to curved geometries. For instance, as an initial part of the realization process discussed above, a curved geometry can be approximated via line segments. The line segments can then be processed as discussed above to provide anti-aliasing for display of the curved geometry.

Having discussed an example implementation scenario and additional embodiments, consider now a discussion of an example system and device in accordance with one or more embodiments.

Example System and Device

Figure 15:
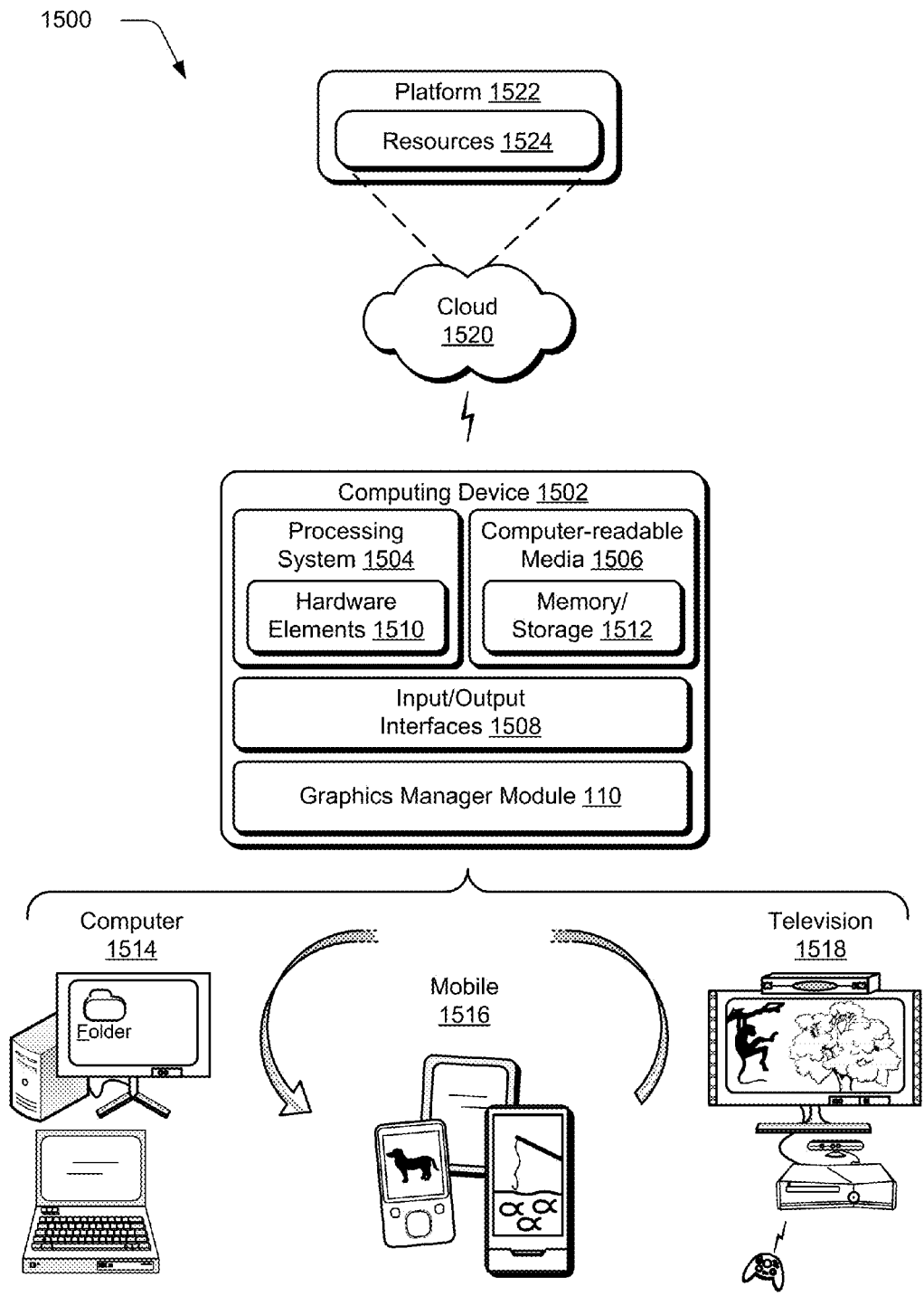
FIG. 15 illustrates an example system and computing device as described with reference to FIG. 1, which are configured to implement embodiments of techniques described herein.

FIG. 15 illustrates an example system generally at 1500 that includes an example computing device 1502 that is representative of one or more computing systems and/or devices that may implement various techniques described herein. For example, the computing device 102 discussed above with reference to FIG. 1 can be embodied as the computing device 1502. The computing device 1502 may be, for example, a server of a service provider, a device associated with the client (e.g., a client device), an on-chip system, and/or any other suitable computing device or computing system.

The example computing device 1502 as illustrated includes a processing system 1504, one or more computer-readable media 1506, and one or more Input/Output (I/O) Interfaces 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1506 is illustrated as including memory/storage 1512. The memory/storage 1512 represents memory/storage capacity associated with one or more computer-readable media. The memory/storage 1512 may include volatile media (such as random access memory (RAM)) and/or nonvolatile media (such as read only memory (ROM), Flash memory, optical disks, magnetic disks, and so forth). The memory/storage 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1510 and computer-readable media 1506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of modules that are executable by the computing device 1502 as software may be achieved at least partially in hardware, e.g., through use of computer-readable storage media and/or hardware elements 1510 of the processing system. The instructions and/or functions may be executable/operable by one or more articles of manufacture (for example, one or more computing devices 1502 and/or processing systems 1504) to implement techniques, modules, and examples described herein.

As further illustrated in FIG. 15, the example system 1500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1502 may assume a variety of different configurations, such as for computer 1514, mobile 1516, and television 1518 uses. Each of these configurations includes devices that may have generally different constructs and capabilities, and thus the computing device 1502 may be configured according to one or more of the different device classes. For instance, the computing device 1502 may be implemented as the computer 1514 class of a device that includes a personal computer, desktop computer, a multi-screen computer, laptop computer, netbook, and so on.

The computing device 1502 may also be implemented as the mobile 1516 class of device that includes mobile devices, such as a mobile phone, portable music player, portable gaming device, a tablet computer, a multi-screen computer, and so on. The computing device 1502 may also be implemented as the television 1518 class of device that includes devices having or connected to generally larger screens in casual viewing environments. These devices include televisions, set-top boxes, gaming consoles, and so on.

The techniques described herein may be supported by these various configurations of the computing device 1502 and are not limited to the specific examples of the techniques described herein. For example, functionalities discussed with reference to the graphics manager module 110 may be implemented all or in part through use of a distributed system, such as over a "cloud" 1520 via a platform 1522 as described below.

The cloud 1520 includes and/or is representative of a platform 1522 for resources 1524. The platform 1522 abstracts underlying functionality of hardware (e.g., servers) and software resources of the cloud 1520. The resources 1524 may include applications and/or data that can be utilized while computer processing is executed on servers that are remote from the computing device 1502. Resources 1524 can also include services provided over the Internet and/or through a subscriber network, such as a cellular or Wi-Fi network.

The platform 1522 may abstract resources and functions to connect the computing device 1502 with other computing devices. The platform 1522 may also serve to abstract scaling of resources to provide a corresponding level of scale to encountered demand for the resources 1524 that are implemented via the platform 1522. Accordingly, in an interconnected device embodiment, implementation of functionality described herein may be distributed throughout the system 1500. For example, the functionality may be implemented in part on the computing device 1502 as well as via the platform 1522 that abstracts the functionality of the cloud 1520.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for anti-aliasing for geometries are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A device comprising:
   at least one processor; and
   one or more computer-readable storage media including instructions stored thereon that, responsive to execution by the at least one processor, cause the device to perform operations including:
     performing an interior tessellation on a geometry to generate a tessellated geometry;
     calculating displacement vectors based on edge unit normal vectors for outer edges of the tessellated geometry;
     processing the tessellated geometry based on the displacement vectors calculated for the tessellated geometry by inwardly shifting vertices of the tessellated geometry according to the displacement vectors to generate a processed geometry with inwardly displaced vertices;
     generating quadrilaterals for the outer edges of the tessellated geometry, the quadrilaterals including a coverage gradient and being based on the edge unit normal vectors and the displacement vectors of the outer edges;
     generating bevels for convex vertices of the outer edges of the tessellated geometry, the bevels including a coverage gradient and being based on the edge unit normal vectors and the displacement vectors of the convex vertices; and
     processing the processed geometry, the quadrilaterals, and the bevels for display to provide anti-aliasing of the geometry.

2. A device as recited in claim 1, wherein the operations include, prior to said performing the interior tessellation, removing one or more self-intersecting portions from the geometry.

3. A device as recited in claim 1, wherein the operations include, prior to said processing the tessellated geometry, annotating the vertices of the geometry with the edge unit normal vectors.

4. A device as recited in claim 1, wherein said performing the interior tessellation on the geometry divides the geometry into interior triangles such that the interior triangles include only vertices that exist in the geometry prior to tessellation, no interior triangles overlap, and the tessellation is watertight such that any two interior triangles sharing an edge share the entire edge.

5. A device as recited in claim 1, wherein the operations include calculating the displacement vectors as a norm function of an incoming edge unit normal vector and an outgoing edge unit normal vector for respective vertices of the geometry.

6. A device as recited in claim 1, wherein said processing the tessellated geometry based on displacement vectors comprises insetting vertices of the tessellated geometry by a distance that corresponds to respective displacement vectors.

7. A device as recited in claim 1, wherein the quadrilaterals are generated for each outer edge of the geometry and such that a first edge of each quadrilateral is opaque or semi-opaque, and a second edge of each quadrilateral opposite the first edge is transparent.

8. A device as recited in claim 1, wherein at least some of the quadrilaterals have a width of one pixel and are configured such that if the geometry is scaled to a different scale, the at least some quadrilaterals remain the same width.

9. A device as recited in claim 1, wherein the bevels include triangles that are generated to fill gaps between adjacent quadrilaterals.

10. A device as recited in claim 1, wherein the bevels are generated such that a vertex of the bevels is opaque or semi-opaque, and an edge of the bevels opposite the vertex is transparent.

11. A device as recited in claim 1, wherein said processing the processed geometry, the quadrilaterals, and the bevels for display comprises:
    processing vertices of the processed geometry, the quadrilaterals, and the bevels to generate a position and coverage values for the vertices; and
    calculating modulated colors for the vertices based on respective coverage values and a brush specified for the vertices.

12. One or more computer-readable storage media comprising instructions stored thereon that, responsive to execution by a computing device, cause the computing device to perform operations comprising:
    processing a tessellated geometry using displacement vectors calculated based on edge unit normal vectors for outer edges of the tessellated geometry by inwardly shifting vertices of the tessellated geometry according to the displacement vectors to generate a processed geometry with inwardly displaced vertices;

generating quadrilaterals for the outer edges of the tessellated geometry based on the edge unit normal vectors and the displacement vectors of the outer edges, the quadrilaterals including a coverage gradient;

generating bevels for convex vertices of the outer edges of the tessellated geometry based on the edge unit normal vectors and the displacement vectors, the bevels including a coverage gradient; and processing the processed geometry, the quadrilaterals, and the bevels for display to provide anti-aliasing of a geometry.

13. One or more computer-readable storage media as recited in claim 12, wherein said operations comprise calculating the edge unit normal vectors for the outer edges of the tessellated geometry, and calculating the displacement vectors based on the edge unit normal vectors.

14. One or more computer-readable storage media as recited in claim 12, wherein the operations include calculating the displacement vectors as a norm function of an incoming edge unit normal vector and an outgoing edge unit normal vector for respective vertices of the tessellated geometry.

15. One or more computer-readable storage media as recited in claim 12, wherein said processing the tessellated geometry based on displacement vectors comprises insetting vertices of the tessellated geometry by a distance and direction that correspond to respective displacement vectors.

16. One or more computer-readable storage media as recited in claim 12, wherein the coverage gradient for the quadrilaterals is such that a first edge of each of the quadrilaterals is opaque or semi-opaque, and a second edge of each of the quadrilaterals opposite the first edge is transparent.

17. One or more computer-readable storage media as recited in claim 12, wherein the coverage gradient for the bevels is such that a vertex of the bevels is opaque or semi-opaque, and an edge of the bevels opposite the vertex is transparent.

18. A computer-implemented method, comprising:

performing an interior tessellation on a geometry to generate a tessellated geometry;

calculating displacement vectors based on edge unit normal vectors for outer edges of the tessellated geometry;

processing the tessellated geometry based on the displacement vectors calculated for the tessellated geometry by inwardly shifting vertices of the tessellated geometry according to the displacement vectors to generate a processed geometry with inwardly displaced vertices;

generating quadrilaterals for the outer edges of the tessellated geometry, the quadrilaterals including a coverage gradient and being based on the edge unit normal vectors and the displacement vectors of the outer edges;

generating bevels for convex vertices of the outer edges of the tessellated geometry, the bevels including a coverage gradient and being based on the edge unit normal vectors and the displacement vectors of the convex vertices; and processing the processed geometry, the quadrilaterals, and the bevels for display to provide anti-aliasing of the geometry.

19. A computer-implemented method as recited in claim 18, further comprising, prior to said performing the interior tessellation, removing one or more self-intersecting portions from the geometry.

20. A computer-implemented method as recited in claim 18, wherein said performing the interior tessellation on the geometry divides the geometry into interior triangles such that the interior triangles include only vertices that exist in the geometry prior to tessellation, no interior triangles overlap, and the tessellation is watertight such that any two interior triangles sharing an edge share the entire edge.

* * * * *